Sept. 12, 1967   T. H. SOUTHWICK   3,340,865
DEVICE FOR DETECTING HALO AND COLOR AURAL RADIATIONS
Filed Dec. 7, 1964   2 Sheets-Sheet 2
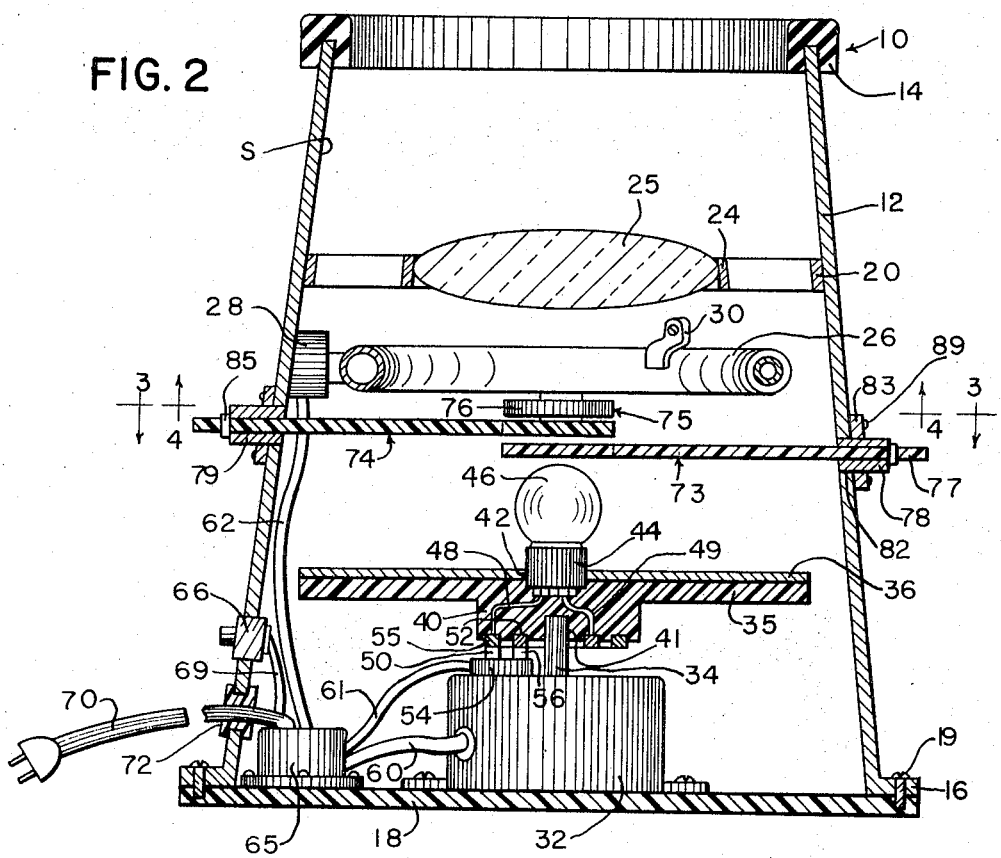
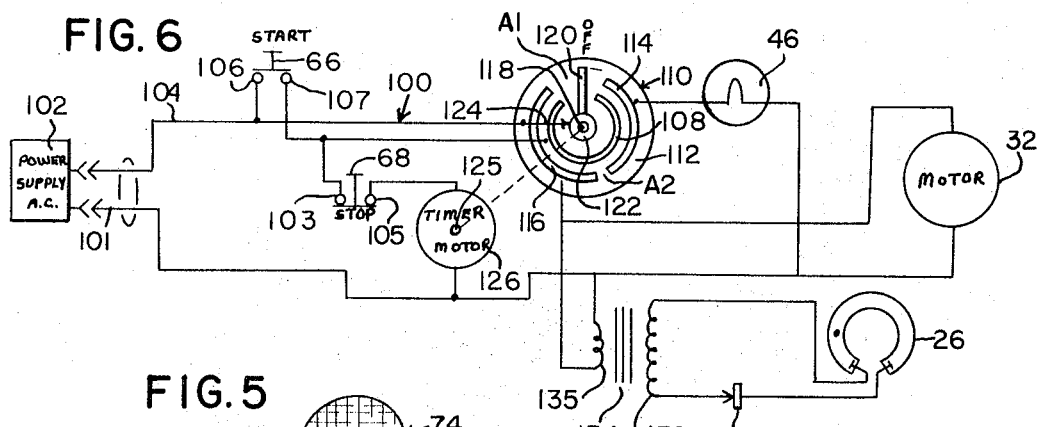
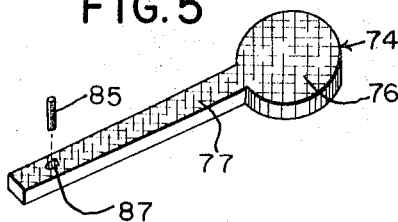
INVENTOR.
Talbot H. Southwick
BY
Polachek & Saulsbury
ATTORNEYS.

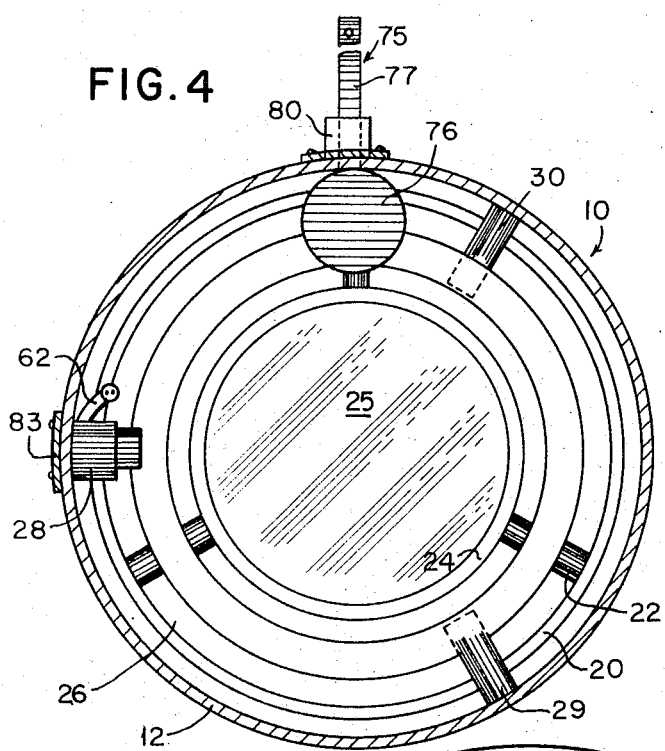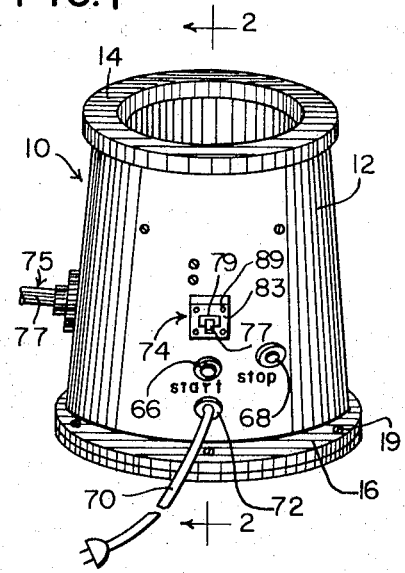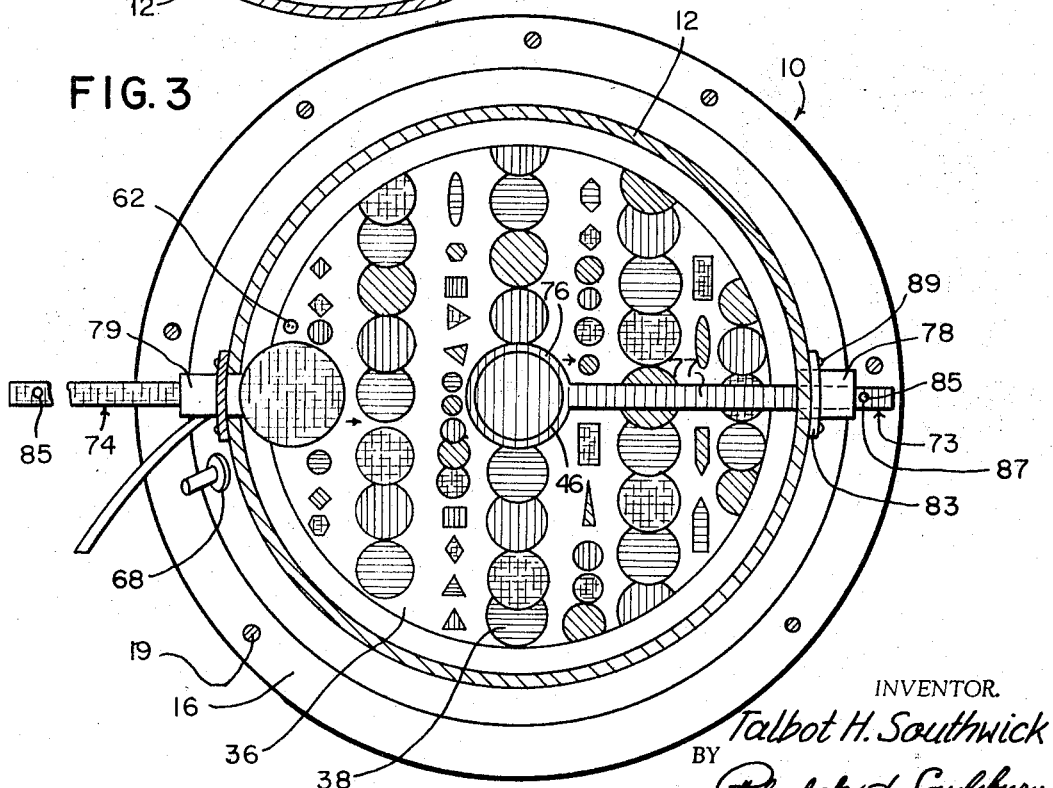

United States Patent Office 3,340,865
Patented Sept. 12, 1967

3,340,865
DEVICE FOR DETECTING HALO AND COLOR
AURAL RADIATIONS
Talbot H. Southwick, 79 Horatio St.,
New York, N.Y. 10014
Filed Dec. 7, 1964, Ser. No. 416,249
11 Claims. (Cl. 128—1)

ABSTRACT OF THE DISCLOSURE

An optical display device for visually conditioning a person, including a housing with an opening therein, a pair of lamps in the housing, one emitting a sustained bright light, the other emitting ultraviolet light, a disk in the housing having a surface with fluorescent spots of different sizes, shapes and colors thereon, which spots are adapted to become luminous when the ultraviolet ray lamp is energized to project the ultraviolet rays upon the spots, and electrical means for cyclically lighting the lamps.

---

This invention relates to an optical display device especially intended for conditioning the visual organs of a person for producing certain visual effects.

According to the invention there is provided an optical display device which includes a generally cylindrical box or housing with an opening into which an operator looks. In the housing is an incandescent electric lamp which can be turned on and off, and an ultraviolet or "black light" lamp, which can be turned on and off. A multicolored disk is rotatably mounted in the housing. This disk has multicolored areas which glow when the ultraviolet light impinges on them. Colored filters are provided in front of the incandescent lamp for selecting and changing the colors of bright light seen by the operator using the device. The operator looking into the housing first sees the bright incandescent lamp which is lighted for about thirty seconds. Then the incandescent lamp is turned off. The interior of the housing remains dark a few seconds and then the ultraviolet lamp is turned on while the multicolored disk is rotated slowly. After about thirty seconds the ultraviolet lamp is then turned off and the operator closes his eyes until he sees the after image in his own mind of the fluorescent colors on rotating disc. After about five seconds the operator opens his eyes. In normal reaction, part of the operator's surroundings will assume flashes of aura or glow. The device can be used by normal persons or even children for amusement purposes.

The device embodying the invention can be arranged for manual control at the several steps of operation, or can be arranged for automatic control, or for both manual, and automatic control.

It is therefore an object of the invention to provide an optical display device for conditioning visual organs, said device including means for producing a bright light in an enclosure, and then producing a rotating multicolored, fluorescent display with or without a black light stimulus in the enclosure for producing a glow.

A further object is to provide a device as described wherein the bright light can be changed to different colors.

Another object is to provide a device as described wherein the device operates automatically for cyclically producing the bright light and then the fluorescent display.

For further comprehension of the invention, and of the objects and advantages thereof, reference will be had to the following description and accompanying drawings, and to the appended claims in which the various novel features of the invention are more particularly set forth.

FIGURE 1 is a side oblique view of a device embodying the invention,

FIG. 2 is an enlarged sectional view taken on line 2—2 of FIG. 1,

FIG. 3 and FIG. 4 are sectional views taken on lines 3—3 and 4—4 of FIG. 2,

FIG. 5 is a perspective view of a light filter member, and

FIG. 6 is a diagram of an electric circuit employed in the device.

Referring first to FIGS. 1 to 4, there is shown the optical display device 10 which includes a tapered box or housing 12. The housing is tubular in form with open top and bottom. At the narrow open top is a resilient channel-shaped pad or molding 14. When a person looks down into the housing the pad forms a light-tight seal on the forehead and cheeks around the person's eyes so that external, ambient light is excluded. At the open bottom of the housing is an annular flange 16 abutting the rim of a bottom closure plate 18 and held by screws 19. Secured near the top of the housing is a spider ring 20 having arms 22 supporting an internal ring 24 in which is fitted a double convex lens 25. The central plane of the lens is horizontal and perpendicular to the central axis of the housing. Located just below the lens 25 is a circular, tubular black light lamp 26. This lamp is supported by a socket 28 on the inner wall of the housing, and by two spring bracket fingers 29, 30 spaced about 120° apart and partially encircling the lamp. Lamp 26 has a glass body and is a fifteen watt self-filtering tube named purple black tube (BLB) by the Stroblite Corp., New York, New York. It emits light in a narrow band peaked at 3650 to 3660 angstrom units. Purple light in this range of wave lengths is popularly known as "black light" since it produces no glowing effects when it impinges on non-fluorescent surfaces. Surfaces which contain suitable phosphors will however glow with a color depending on their chemical constituents. Surfaces of colored tin foil or those colors which luminesce in the dark when previously charged by sunlight or electric light, or powders which are brilliant under incandescent light because of their phosphor chemicals, all such colors do aid production of after image following the process of starting at an incandescent light, then closing one's eyes. Ordinary crayon or printed inks will also produce after image under the above condition of staring at a bright incandescent light and then closing one's eyes. The use of black light on phosphor or fluorescent color surfaces obtains the best results. All the visible colors ranging from red to deep purple can be evoked in fluorescent surfaces by the incidence of black light on a printed or painted surface that is fluorescent. This light is harmless to human eyes even when they are exposed to it for long periods.

Mounted on the bottom plate 18 is a motor 32 having an axially vertical shaft 34 rotating at a speed of not more than approximately twelve revolutions per second. A flat disk 35 is fixed to the shaft. Disk 35 has a sheet 36 of white paper, plastic, or cloth cemented or otherwise secured to its upper side. On the upper white side of the sheet 36 is a plurality of rows of differently colored and shaped fluorescent spots 38. These spots will glow in black light as brightly colored red, yellow, green and blue when exposed to the black light emitted by lamp 26. They may be visible in light of wave lengths longer than that of black light, but will not fluoresce or glow. The internal surface S of the housing may be highly reflective white or silver.

The disk has a thick, central base 40 with a central recess 41 in which shaft 34 is received. A recess 42 is provided at the center of the disk 35 in which seats a socket 44 carrying a removable incandescent lamp 46. Electrical conductors 48, 49 in base 40 are connected to the socket and they terminate at concentric slip rings 50, 52 at the underside of base 40. An electrical connector 54 is mounted on the stationary casing of the motor 32. This connector has spring contacts 55, 56 making continuous contact with rings 50, 52 respectively, for supplying power to the lamp 46 in all positions of the disk 35. Wires 60, 61 and 62 are connected between motor 32, connector 54, socket 28 and circuit component box 65. Pushbutton switches 66, 68 are connected by wires 69 to box 65. Switch 66 is mounted in an opening in the housing 12 near the bottom thereof. A power supply cord 70 is connected to box 65. It extends through a grommet 72 in the side of housing 12.

Lamp 46 is centrally disposed on the central, vertical axis of the housing and on the optic axis of lens 25. When lamp 46 is lighted it appears as an intense white light to a person looking into the housing through the lens. The lens spreads the field of the light so that the person sees almost nothing that glows but this bright light.

Three light filter members 73, 74 and 75 colored respectively, red, yellow and blue are provided in the housing. As clearly shown in FIGS. 2–5, each filter member has a circular end portion 76 slightly larger in diameter than the lamp 46. The filter members may be made of colored transparent plastic material. The filter members each has a stem 77 which extends radially outwardly of the end portion 76 and is slidably disposed in a rectangular tubular holder 78, 79 or 80 each secured in a different opening 82 in the siding of housing 12. The holders have flanges 83 held by rivets or screws 89. The openings 82 may be disposed 90° apart circumferentially of the housing 12 and are spaced slightly apart axially of the housing. Thus the circular end portions 76 can be overlapped. Any two filter portions 76 can be overlapped during use of the device. The operator of the devce, by retracting all filter members until the end portions 76 are stopped at the inner side of housing 12, clears lamp 46 so that white light passes through lens 25. If filter member 73 is extended until its end portion 76 is aligned centrally with lamp 46 the filter member will pass red light. Filter member 74, similarly will pass yellow light, and filter member 75 will pass blue light. If the end portions 76 of the red and yellow filters are superimposed, orange light will pass to lens 25. Similarly the superimposed red and blue filters will pass purple light. Superimposed yellow and blue filters will pass green light. Three superimposed filters will pass no light and this arrangement will not be used except when the device is not in use when all filters can be fully inserted into the device with only the ends of stems 77 projecting radially from housing 12. Pins 85 can be inserted in holes 87 near the free ends of the stems to prevent the stems from passing entirely into the housing. When the filter members are inserted so that pins 85 abut the tubular holders, the circular portions 76 are properly located at the axis of the housing 12 and lamp 46.

FIG. 6 shows the electrical circuit 100 of the device, in circuit 100 power cord 70 can be connected to a suitable power supply 102. Pushbutton switch 68 is a STOP switch which has contacts 103, 105 normally closed. Pushbutton switch 66 is a START switch which has normally open contact 106 connected to power supply wire 104, and open contact 107 connected to arcuate contact 108 of a timer switch 110. Contact 103 is also connected to contact 108. Switch 110 is located in the circuit component box 65 shown in FIG. 2. The switch includes a stationary insulated plate 112 on which is contact 108. This contact is circularly curved and has spaced ends at OFF area A1. The switch has two other arcuate contacts 114 and 116 spaced apart at areas A1 and A2. The switch contacts 114 and 116 are concentric with contact 108. The switch has a rotary shaft 118 carrying a rotary conductive arm 120. Arm 120 is electrically connected with slip ring 122 and brush 124 to switch contact 106 of switch 66. Shaft 118 is operatively connected to the shaft 125 of a timer motor 126. This motor is connected between contact 105 of switch 68 and wire 101 of the power cord. Contact 114 is connected to incandescent lamp 46 having one terminal connected to wire 101. Glow lamp 26 is connected via rectifier 130 to the secondary winding 132 of a transformer 134. The primary 135 winding is connected between power wire 101 and contact 116. Motor 32 which drives disk 35 is connected between power wire 101 and contact 116.

In operation of the device 10 and circuit 100, the person using the device, looks into the dark interior of housing 12. The operator of the device, or the person looking into the device, then presses the button of START switch 66 and holds this button. Rotary arm 120 which is in the OFF position of timer switch 110 at area A1 rotates clockwise as viewed in FIG. 6. The timer motor 126 is started when the switch 66 is closed. When arm 120 reaches contacts 108 and 114 the operator of the device may release the switch 66. The timer motor will continue to operate since it draws current via contacts 103, 105, 108 and arm 120. Lamp 46 will light since current is drawn via arm 120 and contact 114. Lamp 46 will be lighted for about thirty seconds while the person using the device stares at the intense light in the interior of the housing. Lens 25 concentrates and intensifies the light. After about thirty seconds, arm 120 leaves contact 114 and reaches area A2. The lamps 26 and 46 are extinguished and the interior of the housing remains dark for about ten to twelve seconds. Then lamp 26 goes on while disk 35 starts to rotate as motor 32 becomes energized via contact 116 and arm 120. The lamp 26 stays lighted and the disk 35 rotates about thirty seconds. When arm 120 reaches area A1 again the motors 32 and 126 stop and lamp 26 goes out. The operator of the device then closes his eyes. He may be requested at this time to visualize by his mind's eye or imagination pertaining to after image, that group of colors on disc 35. He then opens his eyes and turns from the device with his eyes open, whereupon he will observe externally a glow, radiance, halo or aura at the perimeter of the animate subject now under inspection by the operator. The color of the glow seen around that animate subject may be the color last visualized on the disc 35 by the operator, or may be anyone of those colors, or a combination of them most strongly remembered by that operator, as he viewed the rotating, flourescent multicolored disc 35, with its spots. In any case the colors so viewed will cease to become merely the after image colors formerly seen by the operator in his own mind. They gradually become the colors of the animate subject being viewed by the operator. The after image of the operator when seen within his own mind after seeing glowing surface of disc 35 is called internal aura or halo. The color seen around the subject by the operator who has stared through the housing at the glowing colors of the disc 35 and who now looking at said subject, are the colors named external halo or aura.

If desired, the person using the device or the operating attendant may press the button of switch 68 to open it. This will stop motor 126 since its circuit will be opened. The cycling of the device will then stop while the switch 68 is held open. If lamp 46 is lighted, it will stay lighted. If either or both lamps 46 and 26 are off they will stay off. If lamp 26 is lighted and disk 35 is rotating, lamp 26 will continue to be lighted and motor 32 will continue driving the disk, until switch 68 is released, whereupon the cycle can continue as before. Thus, operating switch 68 at one or more points in the cycle makes it possible to control manually the length of different parts of the cycle with either lamp held on or off or both lamps held off. The device is thus automatic in operation but has manual controls for selective operation if desired. Instead of using a motor 32, it is possible to turn the disk 35 manually via mechanical means such as a suitable crank and gear means.

One or more of the filter members 73, 74, 75 may be interposed in the optical path of the lamp 46 and lens 25 before or during the time lamp 46 is lighted. The filter member can remain in the place set while the lamp 46 is extinguished, since the presence of the filter member will not interfere materially with the multicolored rotating fluorescent view presented later in the cycle of the device.

The way to produce the glowing or fluorescent effect of paint or printed fabric that is luminous in darkly lit areas after it is effected by ultra violet rays that are long wave of about three hundred sixty-five degrees Angstrom units, is by any one of four methods. Any two or three, or four of such methods could be used simultaneously in this device:

(1) The lamp 26, FIG. 2, can be an ultra blue lamp that, by itself, will not fluoresce fabric or paint of a luminescent or fluorescent kind; it must pass its rays through purple plastic translucent glass (73–74–75), FIG. 2, in order to cause a fluorescent glow of paint or fabric on disc 38, FIG. 3.

(2) The lamp can be a black tube type that has within the tube said purple translucent glass filter material. In this case the lamp itself known by the tradename of the Stroblite Corporation of New York City, can cause the glow or fluorescence of fluorescent or luminescent surfaces of 38, FIG. 3. This said filter absorbs most visible light, but transmit over black light.

(3) The lamp can be an incandescent two hundred fifty watt black light bulb of the General Electric type with a life of about forty hours. This bulb can be substituted for the incandescent lamp 46, FIG. 2. Such substitution is done immediately after the first step of staring into housing of incandescent lamp 46, FIG. 2. Such blacklight of bulb type will fluoresce fabric of a fluorescent kind on the disc 36, FIG. 3.

(4) The lamp can be an extremely strong quartz high pressure mercury arc lamp one hundred watt in a sealed beam. The visible light transmitted is in the region of three thousand six hundred sixty Angstrom units range. Said lamp can cause to glow the fluorescent fabric or point 38, FIG. 3.

For example, the lamp 26 in the present drawing is a fluorescent type with a self filtering purple black tube. The purple filter glass that makes the lamp makes ultra violet for the purpose of producing a flow of paints or fabrics specially treated for luminescence, is within the lamp tube. I am able to modify this by changing purple glass plate strips either around an ultra blue light tube as named in Stroblite Corp. of New York city, or by inserting such ultra glass strips 12, 74, 75 now seen in FIG. 2. I am also able to manually substitute for incandescent lamp 46 a black light bulb named purple X by General Electric Corp, and which has two hundred fifty watts and 115–125 volts with fifty hours duration for life of said bulb. This can be done to increase fluorescence of colored paint or fabric of disc 35.

The following is an explanation of behavior in use of this as a toy. One person using the toy is called the operator and the other is called the subject. There may be any number of participants. There are six steps needed to obtain amusement by the use of what is commonly called "after image" that occurs in one's mind particularly after one stares at bright colors and closes one's eyes. This refers to the special means of obtaining after image by this device. Said after image may be derived from staring at glowing fluorescent colors while looking through the housing, or by staring at brightly lit filters of different colors, even though not fluorescent in nature.

Step 1.—An operator stares into the housing of the device for about thirty seconds. He sees an extra bright incandescent bulb of light and no bright colors known in the special way of fluorescence or glowing. Next, the operator looks away from the device and closes his eyes to see the bright light's after image in his own (the operator's) mind. Or he may close his eyes while still having his face and eyes over the housing and touching same, but after the incandescent lamp is turned off, whether by automatic or manual means. He sees color in his mind's eye as an after image coloration.

The operator may look at a subject in a dimly lighted area and observe externally around the subject the after image color's which he first saw within his own mind when his eyes were closed. This is the pre-block light stage of seeing the halo. The later use of black light on fluorescent surfaces improves the intensity of colors within the operator's mind and around the subject he views.

Step 2.—Immediately, next the operator stares through the housing at the rotation of the disc with its cover of fluorescent paints of fabric in multi color. He stares for about thirty seconds at such colors that glow by aid of the black light lamp that is in the housing and above the revolving disc. Now he again closes his eyes and sees by his mind's eye or his after image imagination faculty, those colors of various hues and types. They are virtually the same colors he observed on the rotating disc before closing his eyes and while he stared into the housing.

Step 3.—Now comes a main goal of the device which is to observe the halo colors or the commonly called aural colors around a person known here as the subject. For this purpose the operator who took steps 1 and 2 now looks at the perimeter of the head and body of the subject who is three or more feet away depending on what distance gets the best results. Escape light from the device is enough for this 3rd step, but more light from ordinary room lights may be added, if convenient. Room light outside the device should be dim to a degree making readability of a newspaper's small type hardly possible. When subject is looked at by operator, the best areas are those of the subject that are unclothed and uncolored by cosmetics or other artificial methods.

There is a 4th step that may be used for this toy device. It also gives amusement. The operator may ask the subject to stare into the housing at the filters when they are lighted by the incandescent lamp in the housing. The subject selects and concentrates on one color filter member alone. Then the operator asks the subject to close both eyes while subject is still in the position needed to peer into housing. He asks subject to try to see that color in his own (the subject's) mind's eye. That is, the operator asks the subject to have an after image recall of that color selected by subject before subject closed his eyes. Then the operator tries to inform the subject what color the subject has in mind as an after image effect. He may keep competitive score of his own (the operator's) guesses and compare his results to the guesses of another operator with the same subject who again peers into the housing.

Step 5.—The operator follows instruction of steps 1, 2 only. While he observes colors in his own mind because of after image effect, he tries to note any change of feelings within himself.

While I have illustrated and described the preferred embodiments of my invention, it is to be understood that I do not limit myself to the precise constructions herein disclosed and that various changes and modifications may be made within the scope of the invention as defined in the appended claims.

Having thus described the invention, what I claim as new and desire to secure by Letters Patent is:

1. An optical display device for visually conditioning its operator, comprising a housing, a first lamp supported in the housing for emitting a sustained bright light, said housing having an opening at one end through which said light is visible, a second lamp in the housing for emitting ultraviolet light in a narrow band width peaking at about 3650 angstrom units, a rotatable disk in the housing, said disk having a surface exposed to the second lamp, said surface having fluorescent spots of different sizes, shapes and colors, said spots being rendered luminous when the second lamp is energized to project the ultraviolet light upon the spots, a motor rotatably supporting said disk, and circuit means connected to the first and second lamp for lighting the first lamp in one part of a timed cycle, then extinguishing the first lamp and after a predetermined time simultaneously lighting the second lamp and energizing the motor to turn said disk, said motor rotating the disk at a speed not greater than about twelve revolutions per second.

2. An optical display device for visually conditioning a person, comprising a housing, a first lamp supported in the housing for emitting a sustained bright light, said housing having an opening at one end through which said light is visible, a second lamp in the housing for emitting ultraviolet light in a narrow bandwidth peaking at about 3650 angstrom units, a rotatable disk in the housing, said disk having a surface exposed to the second lamp, said surface having fluorescent spots of different sizes, shapes and colors, said spots being rendered luminous when the second lamp is energized to project the ultraviolet light upon the spots, a motor rotatably supporting said disk, and circuit means connected to the first and second lamps for lighting the first lamp in one part of a timed cycle, then extinguishing the first lamp and after a predetermined time simultaneously lighting the second lamp and energizing the motor to turn said disk; said motor rotating the disk at a speed not greater than about twelve revolutions per second, and a plurality of different colored transparent filter members in the housing selectively disposable between said first lamp and said opening for selectively varying the color of the bright light transmitted to said opening from the first lamp.

3. An optical display device for visually conditioning a person, comprising a housing, a first lamp supported in the housing for emitting a sustained bright light, said housing having an opening at one end through which said light is visible, a second lamp in the housing for emitting ultraviolet light in a narrow bandwidth peaking at about 3650 angstrom units, a rotatable disk in the housing, said disk having a surface exposed to the second lamp, said surface having fluorescent spots of different sizes, shapes and colors, said spots being rendered luminous when the second lamp is energized to project the ultraviolet light upon the spots, a motor rotatably supporting said disk, and circuit means connected to the first and second lamps for lighting the first lamp in one part of a timed cycle, then extinguishing the first lamp and after a predetermined time simultaneously lighting the second lamp and energizing the motor to turn said disk; said motor rotating the disk at a speed not greater than about twelve revolutions per second, said circuit means including a timer switch, said first and second lamps and said motor being connected in circuit with said timer switch so that each of the lamps and said motor is energized for times determined by said timer switch.

4. An optical display device for visually conditioning a person, comprising a housing, a first lamp supported in the housing for emitting a sustained bright light, said housing having an opening at one end through which said light is visible, a second lamp in the housing for emitting ultraviolet light in a narrow bandwidth peaking at about 3650 angstrom units, a rotatable disk in the housing, said disk having a surface exposed to the second lamp, said surface having fluorescent spots of different sizes, shapes and colors, said spots being rendered luminous when the second lamp is energized to project the ultraviolet light upon the spots, a motor rotatably supporting said disk, and circuit means connected to the first and second lamps for lighting the first lamp in one part of a timed cycle, then extinguishing the first lamp and after a predetermined time simultaneously lighting the second lamp and energizing the motor to turn said disk; said motor rotating the disk at a speed not greater than about twelve revolutions per second, said circuit means including a timer switch, said first and second lamps and said motor being connected in circuit with said timer switch so that each of the lamps and said motor is energized for times determined by said timer switch, said circuit further including a timer motor driving said timer switch, and a manually operable other switch in circuit with the timer motor for stopping the motor at any point in said cycle for prolonging the lighting time of either of the lamps and for delaying the lighting of either lamp.

5. An optical display device for visually conditioning a person, comprising a generally cylindrical housing having an opening at one end thereof, a lens located near said opening near one end of an optical line of sight in said housing, an incandescent first lamp supported in the housing for emitting a sustained bright light through said lens to the open end of the housing, a fluorescent, tubular second lamp in the housing, said second lamp being circular in form and disposed in axial alignment with said lens and said first lamp, said second lamp having a deep purple transparent body so that the second lamp emits ultraviolet light in a narrow bandwidth peaking at about 3650 angstrom units, a rotatable disk in the housing spaced from the lamps, said disk having an axis of rotation aligned with the axis of the second lamp, said disk having a surface covered with fluorescent spots of different colors, so that said spots are rendered luminous and visible through the lens when the second lamp is energized to project the ultraviolet light on said surface, said surface being located in said line of sight, a motor rotatably supporting the disk, the circuit means connected to the first and second lamps and motor for lighting the first lamp in one part of a timed cycle, then extinguishing the first lamp and after a predetermined time simultaneously lighting the second lamp and energizing the motor to turn said disk; said motor rotating the disk at a speed not greater than about twelve revolutions per second.

6. An optical display device for visually conditioning a person, comprising a generally cylindrical housing having an opening at one end thereof, a lens located near said opening near one end of an optical line of sight in said housing, an incandescent first lamp supported in the housing for emitting a sustained bright light through said lens to the open end of the housing, a fluorescent, tubular second lamp in the housing, said second lamp being circular in form and disposed in axial alignment with said lens and said first lamp, said second lamp having a deep purple transparent body so that the second lamp emits ultraviolet light in a narrow bandwidth peaking at about 3650 angstrom units, a rotatable disk in the housing spaced from the lamps, said disk having an axis of rotation aligned with the axis of the second lamp, said disk having a surface covered with fluorescent spots of different colors, so that said spots are rendered luminous and visible through the lens when the second lamp is energized to project the ultraviolet light on said surface, said surface being located in said line of sight, a motor rotatably supporting the disk, and circuit means connected to the first and second lamps and motor for lighting the first lamp in one part of a timed cycle, then extinguishing the first lamp and after a predetermined time simultaneously lighting the second lamp and energizing the motor to turn said disk; said motor rotating the disk at a speed not greater than about twelve revolutions per second, said housing having a resilient pad around the periphery of said opening to form a light-tight seal with a person's forehead and cheeks when the person looks into the open end of the housing.

7. An optical display device for visually conditioning a person, comprising a generally cylindrical housing having an opening at one end thereof, a lens located near said opening near one end of an optical line of sight in said housing, an incandescent first lamp supported in the housing for emitting a sustained bright light through said lens to the open end of the housing, a fluorescent, tubular second lamp in the housing, said second lamp being circular in form and disposed in axial alignment with said lens and said first lamp, said second lamp having a deep purple transparent body so that the second lamp emits ultraviolet light in a narrow band width peaking at about 3650 angstrom units, a rotatable disk in the housing spaced from the lamps, said disk having an axis of rotation aligned with the axis of the second lamp, said disk having a surface covered with fluorescent spots of different colors, so that said spots are rendered luminous and visible through the lens when the second lamp is energized to project the ultraviolet light on said surface, said surface being located in said line of sight, a motor rotatably supporting the disk, and circuit means connected to the first and second lamps and motor for lighting the first lamp in one part of a timed cycle, then extinguishing the first lamp and after a predetermined time simultaneously lighting the second lamp and energizing the motor to turn said disk; said motor rotating the disk at a speed not greater than about twelve revolutions per second, and a pluraltiy of different colored transparent filter members in the housing selectively disposable between said first lamp and said opening for selectively varying the color of the bright light transmitted to said opening from the first lamp.

8. An optical display device for visually conditioning a person, comprising a generally cylindrical housing having an opening at one end thereof, a lens located near said opening near one end of an optical line of sight in said housing, an incandescent first lamp supported in the housing for emitting a sustained bright light through said lens to the open end of the housing, a fluorescent, tubular second lamp in the housing, said second lamp being circular in form and disposed in axial alignment with said lens and said first lamp, said second lamp having a deep purple transparent body so that the second lamp emits ultraviolet light in a narrow bandwidth peaking at about 3650 angstrom units, a rotatable disk in the housing spaced from the lamps, said disk having an axis of rotation aligned with the axis of the second lamp, said disk having a surface covered with fluorescent spots of different colors, so that said spots are rendered luminous and visible through the lens when the second lamp is energized to project the ultraviolet light on said surface, said surface being located in said line of sight, a motor rotatably supporting the disk, and circuit means connected to the first and second lamps and motor for lighting the first lamp in one part of a timed cycle, then extinguishing the first lamp and after a predetermined time simultaneously lighting the second lamp and energizing the motor to turn said disk; said motor rotating the disk at a speed not greater than about twelve revolutions per second, and a plurality of different colored transparent filter members in the housing selectively disposable between said first lamp and said opening for selectively varying the color of the bright light transmitted to said opening from the first lamp, said circuit means including a timer switch, said first and second lamps and said motor being connected in circuit with said timer switch so that each of the lamps and said motor is energized for times determined by said timer switch, said circuit further including a timer motor driving said timer switch, and a manually operable other switch in circuit with the timer motor for stopping the motor at any point in said cycle for prolonging the lighting time of either of the lamps and for delaying the lighting of either.

9. An optical display device for visually conditioning a person, comprising a generally cylindrical housing having an opening at one end thereof, a lens located near said opening near one end of an optical line of sight in said housing, and incandescent first lamp supported in the housing for emitting a sustained bright light through said lens to the open end of the housing, a fluorescent, tubular second lamp in the housing, said second lamp being circular in form and disposed in axial alignment with said lens and said first lamp, said second lamp having a deep purple transparent body so that the second lamp emits ultraviolet light in a narrow bandwidth peaking at about 3650 angstrom units, a rotatable disk in the housing spaced from the lamps, said disk having an axis of rotation aligned with the axis of the second lamp, said disk having a surface covered with fluorescent spots of different colors, so that said spots are rendered luminous and visible through the lens when the second lamp is energized to project the ultraviolet light on said surface, said surface being located in said line of sight, a motor rotatably supporting the disk, and circuit means connected to the first and second lamps and motor for lighting the first lamp in one part of a timed cycle, then extinguishing the first lamp and after a predetermined time simultaneously lighting the second lamp and energizing the motor to turn said disk; said motor rotating the disk at a speed not greater than about twelve revolutions per second, and a plurality of different colored transparent filter members in the housing selectively disposable between said first lamp and said opening for selectively varying the color of the bright light transmitted to said opening from the first lamp, said circuit means including a timer switch, said first and second lamps and said motor being connected in circuit with said timer switch so that each of the lamps and said motor is energized for times determined by said timer switch, said circuit further including a timer motor driving said timer switch, and a manually operable other switch in circuit with the timer motor for stopping the motor at any point in said cycle for prolonging the lighting time of either of the lamps and for delaying the lighting of either, said housing having a resilient pad around the periphery of said opening to form a light-tight seal with a person's forehead and cheeks when the person looks into the open end of the housing.

10. An optical display device for visually conditioning a person, comprising a housing, a first lamp supported in the housing for emitting a sustained bright light, said housing having an opening at one end through which said light is visible, a second lamp in the housing for emitting ultraviolet light in a narrow bandwidth peaking at about 3650 angstrom units, a rotatable disk in the housing, said disk having a surface exposed to the second lamp, said surface having fluorescent spots of different sizes, shapes and colors, said spots being rendered luminous when the second lamp is energized to project the ultraviolet light upon the spots, a motor rotatably supporting said disk, and circuit means connected to the first and second lamps for lighting the first lamp in one part of a timed cycle, then extinguishing the first lamp and after a predetermined time simultaneously lighting the second lamp and energizing the motor to turn said disk; said motor rotating the disk at a speed not greater than about twelve revolutions per second, said circuit means including a timer switch, said first and second lamps and said motor being connected in circuit with said timer switch so that each of the lamps and said motor is energized for times determined by said timer switch, said circuit further including a timer motor driving said timer switch, and a manually operable other switch in circuit with the timer motor for stopping the motor at any point in said cycle for prolonging the lighting time of either of the lamps and for delaying the lighting of either lamp, and a plurality of different colored transparent filter members in the housing selectively disposable between said first lamp and said opening for selectively varying the color of the bright light transmitted to said opening from the first lamp.

11. An optical display device for visually conditioning a person, comprising a housing, a first lamp supported in the housing for emitting a sustained bright light, said housing having an opening at one end through which said light is visible, a second lamp in the housing for emitting ultraviolet light in a narrow bandwidth peaking at about 3650 angstrom units, a rotatable disk in the housing, said disk having a surface exposed to the second lamp, said surface having fluorescent spots of different sizes, shapes and colors, said spots being rendered luminous when the second lamp is energized to project the ultraviolet light upon the spots, a motor rotatably supporting said disk; and circuit means connected to the first and second lamps for lighting the first lamp in one part of a timed cycle, then extinguishing the first lamp and after a predetermined time simultaneously lighting the second lamp and energizing the motor to turn said disk; said motor rotating the disk at a speed not greater than about twelve revolutions per second, said circuit means including a timer switch, said first and second lamps and said motor being connected in circuit with said timer switch so that each of the lamps and said motor is energized for times determined by said timer switch, said circuit further including a timer motor driving said timer switch, and a manually operable other switch in circuit with the timer motor for stopping the motor at any point in said cycle for prolonging the lighting time of either of the lamps and for delaying the lighting of either lamp, and a plurality of different colored transparent filter members in the housing selectively disposable between said first lamp and said opening for selectively varying the color of the bright light transmitted to said opening from the first lamp, said housing having a resilient pad around the periphery of said opening to form a light-tight seal with a person's forehead and cheeks when the person looks into the open end of the housing.

References Cited

UNITED STATES PATENTS

| 2,642,771 | 6/1953 | Guist | 128—2 X |
| 2,840,073 | 6/1958 | Zeltzer et al. | 128—76.5 |
| 3,278,676 | 10/1966 | Becker | 178—6 |

FOREIGN PATENTS

| 468,976 | 7/1914 | France. |

RICHARD A. GAUDET, *Primary Examiner.*

SIMON BRODER, *Examiner.*